US007302523B2

(12) United States Patent
James

(10) Patent No.: US 7,302,523 B2
(45) Date of Patent: Nov. 27, 2007

(54) DATA STORAGE

(76) Inventor: Barry Edmund James, 297 Carter Knowle Road, Sheffield S11 9FY (GB)

( * ) Notice: Subject to any disclaimer, the term of this patent is extended or adjusted under 35 U.S.C. 154(b) by 439 days.

(21) Appl. No.: 10/461,753

(22) Filed: Jun. 13, 2003

(65) Prior Publication Data

US 2004/0046803 A1 Mar. 11, 2004

(30) Foreign Application Priority Data

Jun. 13, 2002 (GB) ................................ 0213566.3

(51) Int. Cl.
*G06F 12/00* (2006.01)
(52) U.S. Cl. ..................................................... 711/115
(58) Field of Classification Search ................ 711/115, 711/161, 162
See application file for complete search history.

(56) References Cited

U.S. PATENT DOCUMENTS

| 5,884,325 | A | 3/1999 | Bauer et al. |
| 5,893,116 | A | 4/1999 | Simmonds et al. ......... 707/201 |
| 6,212,512 | B1 | 4/2001 | Barney et al. ................. 707/1 |
| 6,253,295 | B1 * | 6/2001 | Beal et al. ................... 711/162 |
| 2001/0011308 | A1 | 8/2001 | Clark et al. |
| 2002/0147882 | A1 * | 10/2002 | Pua et al. ................... 711/103 |
| 2003/0177323 | A1 * | 9/2003 | Popp et al. ................. 711/162 |

FOREIGN PATENT DOCUMENTS

| EP | 0 713 183 | 5/1996 |
| EP | 1 260 915 | 11/2002 |
| WO | WO 03/063013 | 7/2003 |

\* cited by examiner

*Primary Examiner*—Woo H. Choi

(57) ABSTRACT

A system and method for electronic storage of data objects, including at least a first, designated foreground data storage device and at least a second, designated background data storage device, the data storage devices being connectable by way of at least one releasable connection, and an interface engine adapted to manage the transfer of data objects to and from the devices and also between at least two of the devices when the at least two devices are connected to each other, and to generate a logical stack of all the data objects stored in the system, including an index list of identifiers relating to the data objects, the index list being visible from any one of the designated data storage devices whether connected to another designated data storage device or not. The system and method provides an intuitive and powerful data storage system in which objects can be moved up and down stacks, and promoted to the foreground or demoted to the background depending on their importance or relevance at any particular time.

27 Claims, 1 Drawing Sheet

DATA STORAGE

TECHNICAL FIELD

The present invention relates to a data storage method and system having a user-friendly and natural functionality.

BACKGROUND OF THE INVENTION

The present invention may be used in conjunction with the method and system set out in co-pending UK patent applications number 0205751.1 of 12 Mar. 2002 and 0305650.4 of 12 Mar. 2003, and also in International patent application number PCT/GB03/01047 of 12 Mar. 2003 and U.S. patent application Ser. No. 10/388,210 of 12 Mar. 2003, the full disclosures of which are hereby incorporated into the present application by reference.

Traditionally, electronic data generated by a computer may be stored in the computer's random access memory (RAM), on a hard disk drive (HDD) or saved onto a floppy disk by way of a floppy disk drive. Floppy disks are cheap and portable, but are slow to access, have limited storage space and are not physically robust.

However, many computer users implement a natural data storage strategy, often as part of a wider strategy, whereby data (including documents, spreadsheets and other files or the like) are saved from the computer to one or more floppy disks, and the floppy disks are then stored on a desktop or shelf or the like in the form of a stack or pile. The stack or pile may, as a natural consequence of the order of creation or last use of the data in question, be ordered roughly chronologically. The floppy disks may, by more organised or fastidious users, be externally labelled and/or indexed by date and/or content, and provide a natural filing system for data and documents.

Embodiments of the present invention seek both to apply this natural storage strategy in a significantly more powerful way, and to effect a combination of multiple devices to make a single, logical device ("stack") that affords a user (or a computer system) an effectively infinite storage capacity.

SUMMARY OF THE INVENTION

According to a first aspect of the present invention, there is provided a system for electronic storage of data objects, the system comprising at least a first, designated foreground data storage device and at least a second, designated background data storage device, the data storage devices being connectable by way of at least one releasable connection, and an interface engine adapted to manage the transfer of data objects to and from the devices and also between at least two of the devices when the at least two devices are connected to each other, and to generate a logical stack of all the data objects stored in the system, including an index list of identifiers relating to the data objects, the index list being visible from any one of the designated data storage devices whether connected to another designated data storage device or not.

According to a second aspect of the present invention, there is provided a designated foreground data storage device for use with a computer and adapted for releasable connection to at least one designated background data storage device accessible by the computer, the foreground data storage device including or having access to an interface engine adapted to manage the transfer of data objects to and from the devices and also between at least two of the devices when the at least two devices are connected to each other, and to generate a logical stack of all the data objects stored in the devices, including an index list of identifiers relating to the data objects, the index list being visible from any one of the designated data storage devices whether connected to another designated data storage device or not.

According to a third aspect of the present invention, there is provided a computer program product comprising an interface engine adapted to interface at least a first, designated foreground data storage device and at least a second, designated background data storage device that are releasably connectable to each other, wherein the interface application is operable to manage the transfer of data objects to and from the devices and also between at least two of the devices when the at least two devices are connected to each other, and to generate a logical stack of all the data objects stored in the devices, including an index list of identifiers relating to the data objects, the index list being visible from any one of the designated data storage devices whether connected to another designated data storage device or not.

According to a fourth aspect of the present invention, there is provided a method of electronic data storage, wherein data objects are directed to one or other of at least a first, designated foreground data storage device and at least a second, designated background data storage device, the first and second devices being releasably connectable and interfaced by an interface engine that is operable to manage the transfer of data objects to and from the devices and also between at least two of the devices when the at least two devices are connected to each other, and to generate a logical stack of all the data objects stored in the devices, including an index list of identifiers relating to the data objects, the index list being visible from any one of the designated data storage devices whether connected to another designated data storage device or not.

According to a fifth aspect of the present invention, there is provided a system for electronic data storage, the system comprising a first, designated foreground data storage device and a second, designated background data storage device, the data storage devices being connectable by way of a releasable connection and both being accessible by way of an interface application when the devices are connected, wherein the interface application is adapted to direct data objects to one or other or both of the data storage devices for storage and to retrieve data objects from one or other or both of the data storage devices when the devices are connected, wherein the interface application is further adapted to display an identifier relating to every data object or predetermined set or subset of data objects stored in the storage devices, identifiers relating to data objects stored in the foreground device being flagged as such in a display of the interface application and identifiers relating to data objects stored in the background device being flagged as such in a display of the interface application, and wherein the interface application is operable to display the identifiers relating to the data objects stored in the background device even when the background device is disconnected from the foreground device.

According to a sixth aspect of the present invention, there is provided a designated foreground data storage device for use with a computer and adapted for releasable connection to a designated background data storage device, wherein the foreground device includes or has access to an interface application adapted to:

i) direct data objects to the foreground device from the computer, and optionally to the background device when the foreground device is connected thereto;

ii) retrieve data objects from the foreground device and also from the background device when the foreground device is connected thereto; and iii) display an identifier relating to every data object or predetermined set or subset of data objects stored in the storage devices, identifiers relating to data objects stored in the foreground device being flagged as such in a display of the interface application and identifiers relating to data objects stored in the background device being flagged as such in a display of the interface application, and wherein the interface application is operable to display the identifiers relating to the data objects stored in the background device even when the background device is disconnected from the foreground device.

According to a seventh aspect of the present invention, there is provided a computer program product comprising an interface application adapted to interface a designated foreground data storage device and a designated background data storage device that are releasably connectable to each other, wherein the interface application is operable to:

i) direct data objects to the foreground device, and optionally to the background device when the foreground device is connected thereto, ii) retrieve data objects from the foreground device and also from the background device when the foreground device is connected thereto; and iii) display an identifier relating to every data object or predetermined set or subset of data objects stored in the storage devices, identifiers relating to data objects stored in the foreground device being flagged as such in a display of the interface application and identifiers relating to data objects stored in the background device being flagged as such in a display of the interface application, and wherein the interface application is operable to display the identifiers relating to the data objects stored in the background device even when the background device is disconnected from the foreground device.

According to an eighth aspect of the present invention, there is provided a method of electronic data storage, wherein data objects are directed to one or other of a first, designated foreground data storage device and a second, designated background data storage device, the first and second devices being releasably connectable and interfaced by an interface application that is operable to:

i) direct data objects to the foreground device, and optionally to the background device when the foreground device is connected thereto;

ii) retrieve data objects from the foreground device and also from the background device when the foreground device is connected thereto; and iii) display an identifier relating to every data object or predetermined set or subset of data objects stored in the storage devices, identifiers relating to data objects stored in the foreground device being displayed in a first field of the interface and identifiers relating to data objects stored in the background device being displayed in a second field of the interface, the second field of the interface being adapted to continue to display the identifiers relating to the date objects stored in the background device even when the background device is disconnected from the foreground device.

There may be provided more than one background data storage device, each of the background storage devices being accessible by way of the interface engine or interface application. In this way, a chain of any number of data storage devices may be created, the whole chain being presented to a user or a system as a single "Hyperstack™" by way of the interface engine or interface application, although data objects may be distributed across any number of the devices.

The data objects may be files or more complex structures including folder trees and software objects such as applications and the like.

The interface application or interface engine advantageously resides in the first, designated foreground device, but may reside elsewhere on a computer to which the foreground device has access when connected thereto.

The foreground data storage device may be a solid state or other device adapted for releasable connection to a host computer by way of a Universal Serial Bus (USB) port or any other appropriate connection, preferably a "hot-pluggable" connection, including wired and wireless connections (e.g. Bluetooth®), the device presenting itself to the computer as an additional drive. An example of such a device is disclosed at www.pendrive.com, which discloses a USB flash memory drive suitable for use with the present invention. These devices are advantageous, in comparison to floppy disks, since they have a higher memory capacity, greater robustness, and expected eventual lower cost. Furthermore, such devices are fully portable, and may be carried with a person wherever that person may be. Ultimately, the foreground device may be in the form of a finger ring or other type of jewellery, or even in the form of a subcutaneous or other form of bioimplant powered by an externally radiated energy field (e.g. by way of electromagnetic induction) or by a battery pack worn by the user. Such a device may communicate with a host computer and/or a background device by way of Bluetooth® or any other type of wireless communications protocol.

The background data storage device may be an HDD on a computer to which the foreground device is connected, or may be any other form of memory device, including solid state devices (e.g. RAM, flash memory etc) or other devices, including "virtual hard drives" accessible by way of the Internet/Web.

Generally speaking, each data storage device, whether foreground or background, may be a physical device (such as a USB drive or an HDD) or may be a logical or virtual device, such as a Web-based data vault or the like.

Preferably, the background device is such as to allow relatively quick access thereto by way of the interface engine or application.

In essence, embodiments of the present invention may provide a contiguous stack of data objects that may be elegantly distributed over at least two devices (foreground and one or more background) while allowing a user or an operating system to access the data objects by way of a single stack interface (i.e. the interface engine or interface application), any complexity being hidden from the user. In particular, the stack interface may be such as to display identifiers relating to data objects stored in the foreground device in a first field and identifiers relating to data objects stored in the background device in a second field, and to maintain a full list of the identifiers in the second field even when the foreground device is disconnected from the background device and the data objects stored in the background device are therefore not available to the foreground device. Alternatively, the interface may present a display having a single field, but with identifiers relating to each data object being flagged (e.g. colour-coded or otherwise identified) so as to indicate on which device the data object in question is stored.

In this way, when the foreground device is connected, say, to another computer, a user will still be able to view the a list of the contents of the entire stack, even though he or she will not be able to access data objects listed in the second field of the interface unless a connection is established (possibly by way of a telecommunications link) with the remote background device.

As far as a user is concerned, he or she will always be dealing with a single stack, which is or may be notionally infinite in length or size (limited only by the memory capacity of the devices used, which may be extended or added to as required). In this way, a single stack may serve a user for his or her entire lifetime, not just the lifetime of a project or device, through multiple generations of hardware. Furthermore, additional stacks may be allocated to particular projects, organisations, company departments etc., with sub-stacks, linked stacks and/or the like being configured as appropriate. By providing a chain of devices (e.g. a plurality of background devices that are releasably connectable to each other and/or the foreground device), and by providing a mechanism for editing the chain (e.g. adding devices to increase storage capacity, removing and/or clearing older/redundant devices etc.), a continuous trail of data objects may follow a user throughout his/her whole lifetime without the need for continuous or frequent weeding or tidying thereof.

While it is known for a physical data storage device (e.g. an HDD) to be represented as more than one logical (or virtual) device, embodiments of the present invention allow two or more devices to be combined together and used either individually or singly (when disconnected) or as a single coherent entity (a "Hyperstack"™) when connected to each other.

Typically, the foreground and background devices may have different characteristics as to capacity, speed of access, availability, portability and so forth. However, the foreground and background devices may be logically and even functionally equivalent.

In many preferred embodiments, certain features enabled by aspects of the present invention (such as cross-listing and the like) are limited to the foreground device. However, it is to be appreciated that the foreground and background devices may be seen as logically equivalent, and in some embodiments may have equivalent functionality. For example, the background device or a series of linked background devices may be provided with a predetermined degree of autonomy from the foreground device. Thus, for example, each linked device can be adapted to list or enumerate data objects held by any or all or any subset of the other linked devices, typically subject to information and changes to data being automatically updated at a date and time of last connection between a listing device and a listed device.

The interface may be in the form-of a User Interface (UI), for example a Graphical User Interface (GUI) or any other appropriate form (graphical or otherwise), and may be integrated into a particular environment at a high (application) level or at a lower (operating system/UI/GUI) level. Alternatively or in addition, the interface may be presented to an appropriate part of an operating system by way of an Application Program Interface (API) or the like.

The interface preferably allows data objects to be promoted (moved) from the background device to the foreground device (i.e. moved to the top of the stack), and also to be demoted (moved) from the foreground device to the background device (i.e. moved down the stack to "archive") as desired by the user. It is particularly advantageous for the interface to display identifiers (e.g. filenames) for every data object stored in both the foreground device and the background device, even when these are disconnected from each other. In this way, a user remains aware of the full contents of both the foreground and background devices (i.e. the full contents of the stack), even if only objects stored in the foreground device are accessible (for example, when the user connects his/her foreground device to a computer that is not his/her "home" computer including, say, an HDD acting as the background device).

In some embodiments, the interface may operate a "geological" data storage algorithm, with data objects created or amended most recently being stored in the foreground device and older data objects being sequentially relegated to the at least one background device as the foreground device reaches capacity. In other words, the data objects may be arranged in date and/or time order (for example date/time of first creation, or date/time of last modification), either ascending or descending. Alternative data storage algorithms may selectively be employed, for example to keep the smallest data objects in the foreground device, or data objects relating to a particular project or the like, or any selectable criteria or attributes of the data objects or the data represented by the data objects. It will be apparent that any desired data storage algorithm may be implemented without undue difficulty.

The listing of the data objects or the indentifiers relating thereto may be made across all linked devices making up the HyperStack™ (whether connected at any given time or not), or merely across a single device or chosen subset of linked devices.

In general, the stack of data objects can be manipulated (e.g. insertion, extraction or transfer of data objects between devices) only when the foreground device is present, although the foreground device may allow the full list of identifiers relating to all data objects or sets or subsets of data objects stored in the stack to be displayed even when the foreground device is disconnected from the at least one background device.

The interface may be such as to provide for enhanced management of the contents of the stack so that a user may:

i) Determine (for example by way of "drag and drop" or other means) where a data object should be positioned within the stack.

ii) Request that a data object be held in encrypted form.

iii) Request that a data object be held in a "zipped" or compressed state.

iv) Group predetermined data objects together (for example in a folder or the like).

v) View the data objects in various alternative orders/sequences (e.g. by date, by size, by type etc.).

vi) Attach one or more keywords or the like to a data object.

vii) Attach an application to a data object type so that data objects of that type can be auto-launched.

viii) Search for data objects with predetermined characteristics within the stack.

Embodiments of the present invention allow a user to operate with a similar functionality as with a stack of floppy disks, for example exchanging working files between two host computers, and/or holding large quantities of information spread over a number of data objects within a stack.

However, embodiments of the present invention may provide significantly enhanced functionality over a stack of floppy disks:

i) The management of virtual "disks" (i.e. data objects) is electronic rather than manual, making search and retrieval of data objects much easier and faster.

ii) The management of storage media involved in the device chain (i.e. foreground to background device and vice versa) is automated so as to be optimised for portability (and/or other factors).

iii) The size limit for any one data object is the available capacity of the largest unit in the device chain. A management algorithm may be provided so as to reorganise data objects across device boundaries and thereby to shuffle data objects to optimise availability. For full portability, a data object must be small enough to be stored within the foreground device. However, by using the Internet/Web as a background device, larger data objects may be accessed from any remote location with Internet/Web access.

iv) Documents and data objects may be intelligently managed across multiple physical devices with permanent, semi-permanent (e.g. networks) and/or releasable (e.g. USB) connections.

v) Embodiments of the present invention provide for self-management of data objects and documents and the like. In other words, the methods, systems and products of embodiments of the present invention are able to take responsibility for organising data objects and documents and the like over the various physical and virtual storage devices available thereto. This may be achieved by predefining various filing criteria and applying a suitable filing algorithm based on these criteria.

vi) Documents and data may be automatically internally duplicated or copied so as to guard against loss or failure of any particular physical or virtual storage device.

vii) Embodiments of the present invention are hardware-independent, treating memory managed as a traditional filing system as a mere substrate, units of which may be replaced at will without impact on the core virtual stack/device.

viii) Embodiments of the present invention may be hardware agnostic, at least beyond certain minimum requirements common to "traditional" memory devices such as HDDs and removable flash drives.

BRIEF DESCRIPTION OF THE DRAWINGS

For a better understanding of the present invention and to show how it may be carried into effect, reference shall now be made by way of example, to the accompanying drawings, in which.

DETAILED DESCRIPTION

Figure 1:
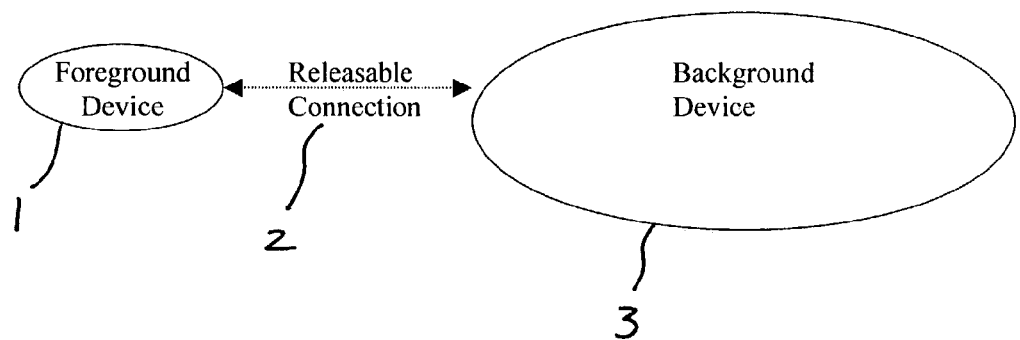
FIG. 1 shows a simple architecture relating to the present invention.

FIG. 1 shows a simple architecture comprising a foreground device 1, which may be a USB drive or any other appropriate type of device as hereinbefore described, provided with a releasable connection 2 to a background device 3, which may be an HDD or any other appropriate type of device as hereinbefore described. In general, the foreground device 1, being portable, will have a smaller memory capacity than the background device 3. The releasable connection 2 may be a USB connection or any other appropriate type of releasable connection as hereinbefore described. In a typical example, the foreground device 1 is a USB flash memory drive adapted for releasable connection to a host computer (not shown) by way of a USB connection, and the background device 3 is an HDD in the host computer. Data objects may be transferred from the foreground device 1 to the background device 3 and vice versa by way of the releasable connection 2.

Figure 2:
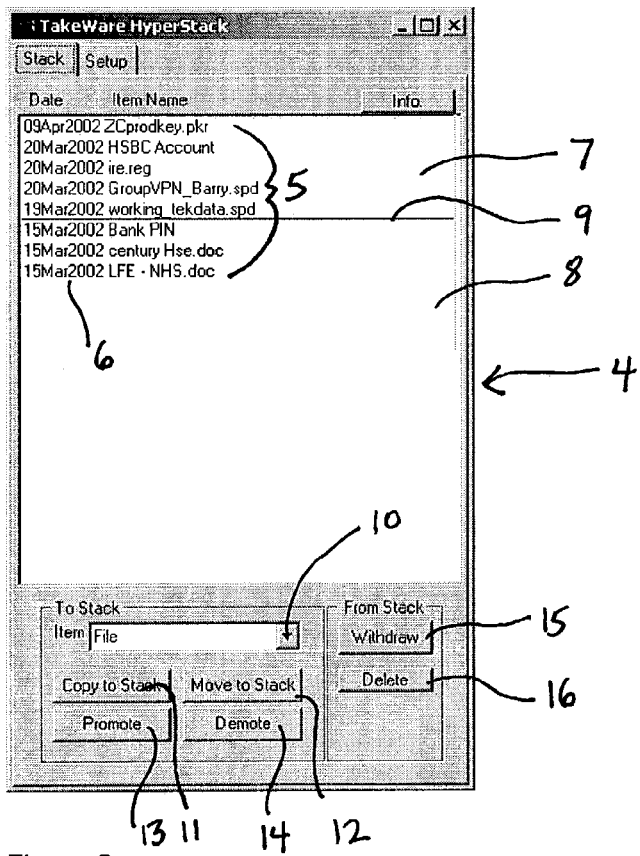
FIG. 2 shows an example of an interface display of embodiments of the present invention.

FIG. 2 shows an embodiment of an interface for use with embodiments of the present invention. The interface comprises a window 4 in which is displayed a list of filenames 5 relating to stored data objects and associated dates 6. The list of filenames 5 indicates the contents of the stack, and acts as a stack index. The list of filenames 5 is distributed across two fields 7, 8 of the interface, the fields 7, 8 being separated by a line 9. The field 7 above the line 9 contains the filenames 5 of data objects stored within the foreground device 1, and the field 8 below the line 9 contains the filenames 5 of data objects stored within the background device 3. In the present example, it may be seen that older data objects are stored in the background device 3, with more recent data objects being retained in the foreground device 1. In normal use, when a data object is added to the stack, it will be placed at the top of the stack and stored within the foreground device 1. In order to make room for the new data object within the foreground device 1, it may be necessary automatically to move one or more data objects located lower down in the stack but still in the foreground device 1 (i.e. just above the line 9) from the foreground device 1 to the background device 3.

The interface is provided with additional functionality accessible by way of the window 4. A drop-down directory/filename listing relating to all files available on the host computer may be obtained by clicking button 10. Data objects may be chosen/highlighted in this listing and either copied to the stack by clicking button 11, or moved to the stack by clicking button 12. Additionally, filenames 5 may be chosen/highlighted within fields 7 or 8 of the interface and promoted from the background device 3 to the foreground device 1 by clicking button 13, or demoted from the foreground device 1 to the background device 3 by clicking button 14. Button 15 allows a data object highlighted in the stack index to be withdrawn from the stack and moved to a region of the HDD of the host computer not used as the background device 3. Button 16 allows a data object highlighted in the stack index to be completely deleted.

As an example of how embodiments of the present invention may be implemented, there follows an extract of pseudocode detailing various methods and function calls required to put an embodiment of the invention into effect with a USB drive and an HDD as, respectively, the foreground device 1 and the background device 3. The methods and function calls convert an ordinary dataVault/repository into a stack of an embodiment of the present invention.

EXAMPLE

```
======= DV Changes (2b) ==================
- DVURLPrefix, setDVURLprefix( ) / getDVURLPrefix( ); -
defaulted to " "
private boolean addItem( )
{    // This is where DV locn is allocated and
therefore . . .
    // This needs to take cognisance of
foreground/background
}
- dupe chx
TODO:
Check mechanism for handling DVURL in DV - to take
account for fg/bg
???
======= DV Changes (2b) ==================
HyperStack extends DataVault
{
HyperStack(String xmlIniFile);
```

-continued

```
HyperStack(String dvForeground, dvBackgroundForNewItems);
{
    // Ensure folders exist
}
}
HS Methods
// ??? How is order maintained (XML) <--> UI (seqNo?) ???
// ??? currently, order of XML items ???
///// Un Modified/overloaded Methods (from DV)
{list}
///// Modified / overloaded Methods (from DV)
{addText( )/other}
boolean extract( )
{
    // Check if ( isBackgroundItem( )
    // AND ( NOT isBackgroundDVAvailable( ) ) - report error
    // otherwise proceed as normal for dv
    super.extract( );
}
private boolean addFile(String label, String fromURL,
String assocApp, String client)
{
    // 'Push' a file onto the stack
    // UI Note: if Item is bigger than whole foreground
device warn user . . .
    // use jlib.totalDiscSpace( );
    // long spaceRequired = spaceReqFor(fromURL);
    // if Item is bigger than whole foreground device
then place straight into background
    // if ( spaceRequired > (jlib.totalDiscSpace( )-
allowanceForXMLIndex) )
    //    return addFileBackground( );
    // Make Space on the ForeGround Device
    makeSpaceFor(spaceRequired);
    super.addFile(label, fromURL, assocApp, client);
}
public static long spaceReqFor(String url)
{
    // Calculate the space required for the named filre
given current settings for enc/zip;
    return jlib.fileStrToObj(url).length;
}
// LATER
//private boolean addFileToBackground(String label,
String fromURL, String assocApp, String client)
//{
    // setDVURLPrefix( )
//    // This is the same as foreground except the URL is
qualified with a location
    // addFile( );
    // setDVURLPrefix( )
//}
///// New Methods
popAndPush(item)
(
    // Pull item from stack and push it back at the top
    if ( isBackgroundItem( ) )
    {
        // moveFwd( );
    }
    else
    {
        // put to top of the stack
    }
)
boolean makeSpaceFor(long size)
{
    // swap items into background to make room in
foreground
    // while (jlib.freeDiscSpace(DriveLetter( )) < size)
    //{
        // swappingItem = nextItem( );
        // moveBack(swappingItem); // swap next item
    //}
    swappingItem=" ";
    return true;
}
```

```
// For monitoring purposes
public getSwappingItem( ) {return swappingItem;} // Have
athread monitor this ???
private String swappingItem=" ";
boolean moveFwd(String dvURL) // This will be of form
"C:/TakeWare/Folder/01234567890.dvt"
{
    String from = dvURL;
    String to = jlib.getName(dvURL);
    // Move item to forground (USB) memory from
background (HDD/WWW)
    // makeSpaceFor(size)
    // switchItem(from, to);
}
boolean moveBack(String dvURL) // This will be of form
"01234567890.dvt"
{
    String from = dvURL;
    String to = dvBackgroundForNewItems+dvURL;
    // Move item to background memory (HDD/WWW) memory
from foreground (USB)
    // switchItem(from, to);
}
private boolean switchItem(String from, String to) //
Move the item from foreground to background or vice versa
{
    // copy the file
    // change the reference
    // delete/shred the old file - ??? If on HDD better
still send it to a shredList for later???
}
boolean isBackgroundItem(String url) // check if item is
in the background (not USB) memory
{
// Does it contain any slashes (or start x:/) ?
// eg 01234567890.dvt = local
// c:/TakeWare/My HyperStack/Data/01234567890.dvt
// ftp://www.TakeWare.com/My
HyperStack/Data/01234567890.dvt
// file://c:/My HyperStack/Data/01234567890.dvt
}
boolean isBackgroundDVAvailable( ) // are we on the 'home'
PC say / Is the net available.
{
    // look for named folder/xml file . . .
}
boolean isHS(String ref) // check if there are any
background (not USB) items
{
    // Is this a DV or a HS - A dv is a HS with no
background items.
    // check each item isBackgroundItem( )
}
String foregroundDVLocn = // the dataVault;
String backgroundDVLocn = ; // C:/TakeWare/My
HyperStack/Data/
void setForegroundDVLocn(String s){ }
void setBackgroundDVLocn(String s){ }
```

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

What is claimed is:

1. A system for electronic storage of data objects on a computer readable medium, the system comprising at least one designated foreground data storage device and a plurality of designated background data storage devices, the foreground and background data storage devices being connectable by way of at least one releasable connection, and an interface engine adapted to manage the transfer of data objects to and from the devices and also between the foreground device and at least one of the plurality of background devices when the foreground and said at least one of the plurality of background devices are connected to each other, and to generate a logical stack of all the data objects stored in the system, including an index list of identifiers relating to the data objects, the index list being visible from either the foreground or the at least one background device whether connected to another designated data storage device or not, wherein an interface application is adapted automatically to move at least a first data object from said at least one designated foreground data storage device to at least one of said designated background data storage devices when there is insufficient room to transfer a second data object to said at least one designated foreground data storage device, when it is required to copy said second data object to said at least one first designated foreground device, and wherein the interface application is further adapted automatically to manage a chain of said data storage devices so as to present to a user a single data stack structure and to enable individual data storage devices to be freely removed and/or replaced and/or upgraded such that the data stack structure is automatically preserved independent of hardware over which it is distributed.

2. A system as claimed in claim 1, wherein the system is adapted to copy a first data object stored on the at least one designated foreground device to at least one of the plurality of designated background storage device, when it is required to delete the first data object from the designated foreground device.

3. A system as claimed in claim 1, wherein the interface application is adapted to provide an indication in said index list whether a data object is stored in a designated foreground or background data storage device.

4. A system as claimed in claim 1, wherein the foreground device is a solid state non-volatile memory device including means for releasable connection to a host computer.

5. A system as claimed in claim 4, wherein the means for releasable connection is a hard-wired connection, such as a USB or similar connection.

6. A system as claimed in claim 5, wherein the means for releasable connection is a wireless connection, infrared connection, or radio frequency connection.

7. A system as claimed in claim 1, wherein at least one of the background devices is a disk drive, solid state or other non-volatile memory device to which a host computer has access when the foreground device is connected thereto.

8. A system as claimed in claim 1, wherein at least one of the background devices is a non-volatile memory device remote from the host computer, such as a virtual hard drive accessible by way of a telecommunications link.

9. A designated foreground data storage device for storage of data objects on a computer readable medium, the data storage device combined for use with a host computer and adapted for releasable connection to a plurality of designated background data storage devices accessible by the host computer, the foreground data storage device including or having access to an interface engine adapted to manage the transfer of data objects to and from the devices and also between at least two of the devices when the at least two devices are connected to each other, and to generate a logical stack of all the data objects stored in the devices, including an index list of identifiers relating to the data objects, the index list being visible from any one of the designated data storage devices whether connected to another designated data storage device or not, and wherein the interface application is adapted automatically to move at least a first data object from said designated foreground data storage device to said at least one designated background data storage device when there is insufficient room to transfer a second data object to said designated foreground data storage device, when it is required to copy said second data object to said designated foreground device, and wherein the interface engine is further adapted automatically to manage a chain of said data storage devices so as to present to a user a single data stack structure and to enable individual data storage devices to be freely removed and/or replaced and/or upgraded such that the data stack structure is automatically preserved independent of hardware over which it is distributed.

10. A foreground device as claimed in claim 9, comprising a solid state non-volatile memory device including means for releasable connection to a host computer.

11. A foreground device as claimed in claim 10, wherein the means for releasable connection is a hard-wired connection, such as a USB or similar connection.

12. A foreground device as claimed in claim 10, wherein the means for releasable connection is a wireless connection, infrared connection, or radio frequency connection.

13. A computer program product embodied in a computer readable medium including executable instructions to achieve improvements in data storage, comprising an interface engine adapted to interface at least one designated foreground data storage device and a plurality of designated background data storage devices that are releasably connectable to each other, wherein the interface application is operable to manage the transfer of data objects to and from the devices and also between at least two of the devices when the at least two devices are connected to each other, and to generate a logical stack of all the data objects stored in the devices, including an index list of identifiers relating to the data objects, the index list being visible from any one of the designated data storage devices whether connected to another designated data storage device or not, and wherein the interface application is adapted automatically to move at least a first data object from said at least one designated foreground data storage device to at least one of said designated background data storage devices when there is insufficient room to transfer a second data object to said at least one designated foreground data storage device, when it is required to copy said second data object to said at least one designated foreground device; and wherein the interface application is further adapted automatically to manage a chain of said data storage devices so as to present to a user a single data stack structure and to enable individual data storage devices to be freely removed and/or replaced and/or upgraded such that the data stack structure is automatically preserved independent of hardware over which it is distributed.

14. A method of electronic data storage of data objects embodied in a computer readable medium, comprising:
   directing data objects to one or other of at least one designated foreground data storage device and at least one of a plurality of designated background data storage device;
   releasably connecting the foreground and background devices and interfaced by an interface engine that is operable to manage the transfer of data objects to and from the devices and also between at least two of the devices when the at least two devices are connected to each other;
   generating a logical stack of all the data objects stored in the devices, including an index list of identifiers relating to the data objects, the index list being visible from any one of the designated data storage devices whether connected to another designated data storage device or not;

operating the interface engine such that it is operable to move automatically at least a first data object from said designated foreground data storage device to said at least one designated background data storage device when there is insufficient room to transfer a second data object to said designated foreground data storage device, when it is required to copy said second data object to said designated foreground device, managing a chain said data storage devices by the interface engine so as to present to a user a single data stack structure and to enable individual data storage devices to be freely removed and/or replaced and/or upgraded such that the data stack structure is automatically preserved independent of hardware over which it is distributed.

15. A method according to claim 14, wherein the foreground device is a solid state non-volatile memory device including means for releasable connection to a host computer.

16. A method according to claim 15, wherein the means for releasable connection is a hard-wired connection, such as a USB or similar connection.

17. A method according to claim 15, wherein the means for releasable connection is a wireless connection, infrared connection, or radio frequency connection.

18. A method according to claim 14, wherein at least one of the background devices is a disk drive, solid state or other non-volatile memory device to which a host computer has access when the foreground device is connected thereto.

19. A method according to claim 14, wherein at least one of the background devices is a non-volatile memory device remote from the host computer, such as a virtual hard drive accessible by way of a telecommunications link.

20. A system as claimed in claim 1, wherein the interface engine or interface application is a user interface (UI).

21. A system as claimed in claim 1, wherein the interface engine or interface application is an application program interface (API).

22. A foreground device as claimed in claim 9, wherein the interface engine or interface application is a user interface (UI).

23. A foreground device as claimed in claim 9, wherein the interface engine or interface application is an application program interface (API).

24. A computer program product as claimed in claim 13, wherein the interface application is a user interface (UI).

25. A computer program product as claimed in claim 13, wherein the interface application is an application program interface (API).

26. A method according to claim 14, wherein the interface engine or interface application is a user interface (UI).

27. A method according to claim 14, wherein the interface engine or interface application is an application program interface (API).

* * * * *